Sept. 15, 1959 P. W. McVEY 2,903,929
FERRULE REDUCER
Filed Feb. 13, 1958 2 Sheets-Sheet 1
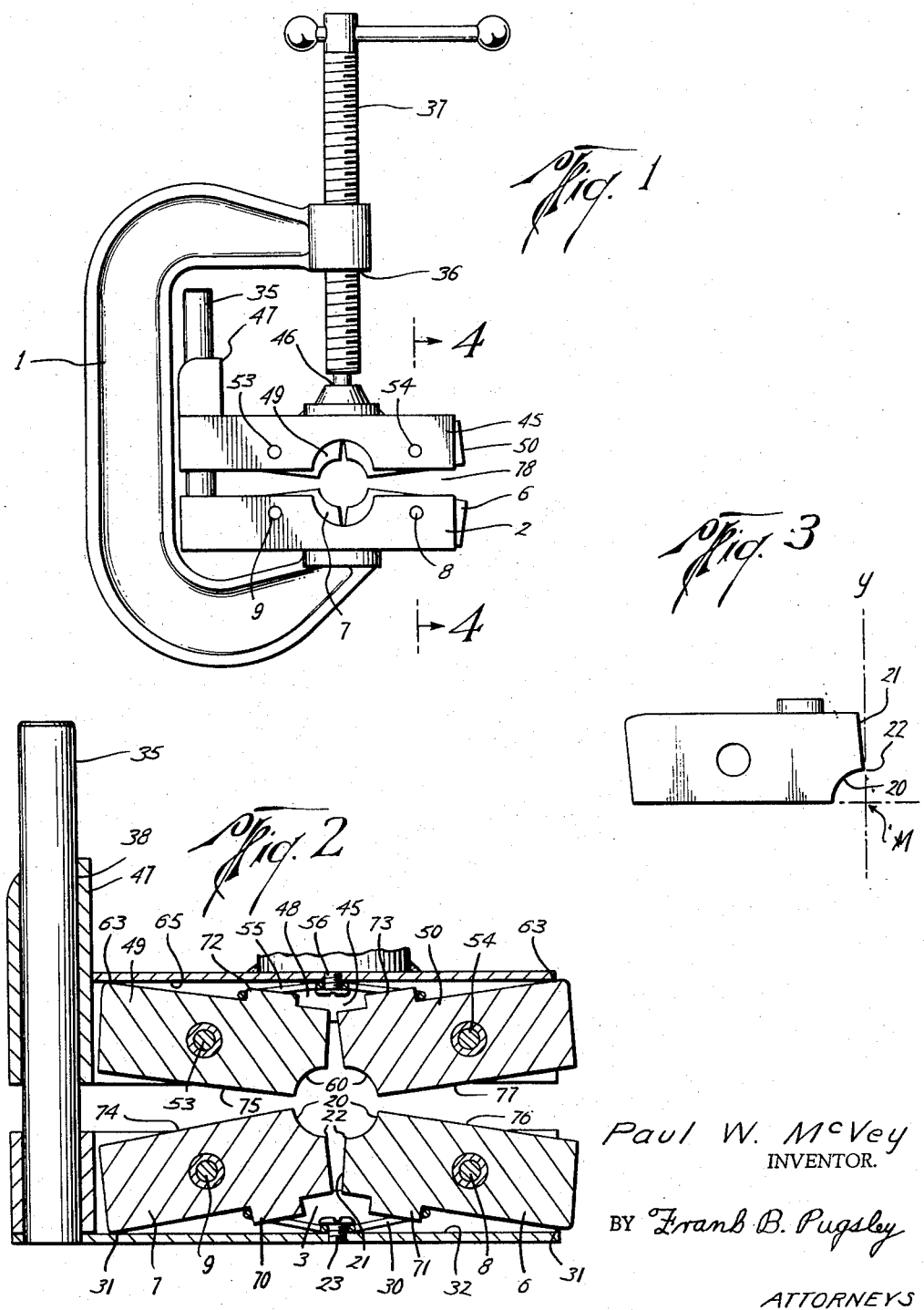
Paul W. McVey
INVENTOR.
BY Frank B. Pugsley
ATTORNEYS

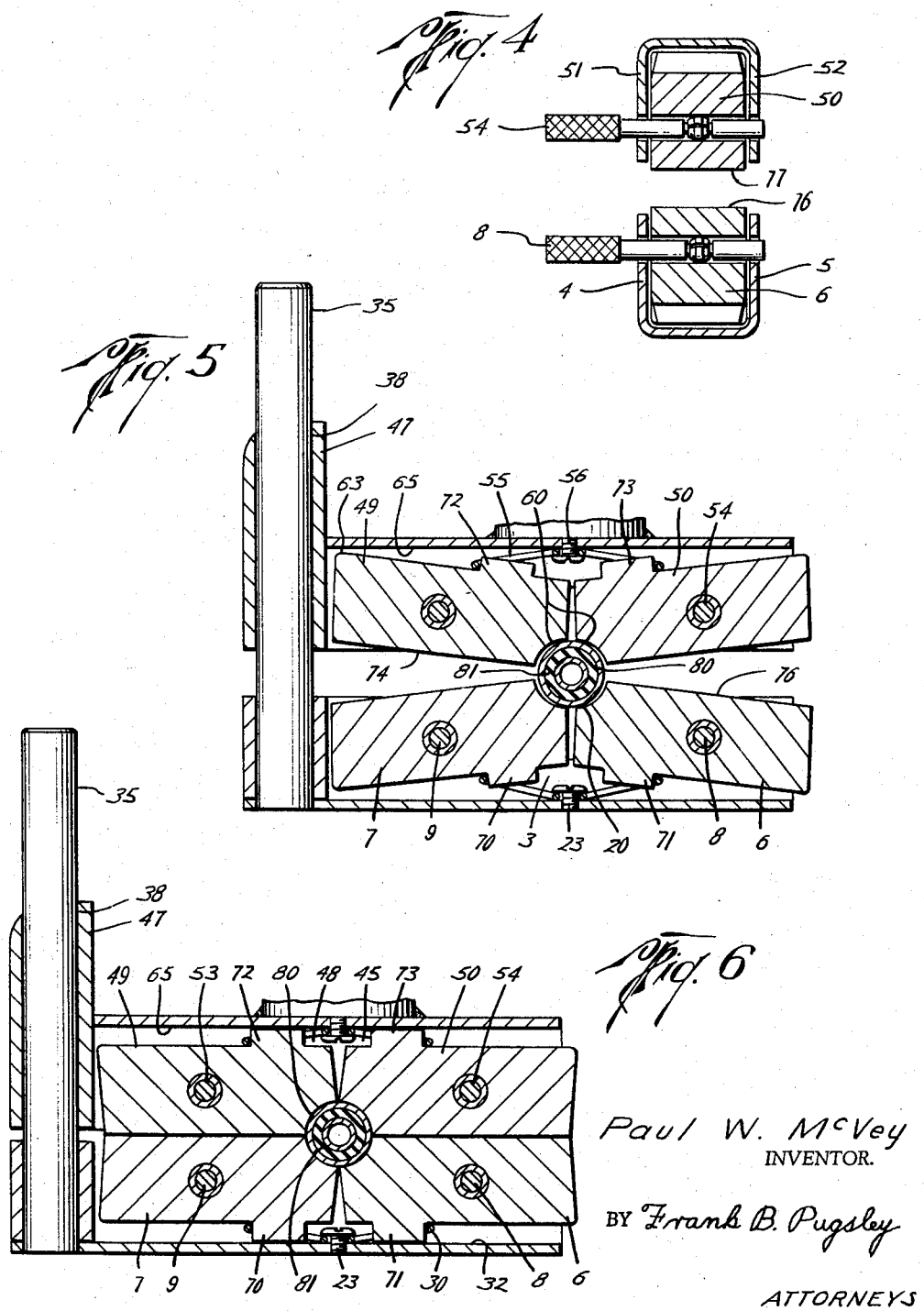

United States Patent Office 2,903,929
Patented Sept. 15, 1959

2,903,929

FERRULE REDUCER

Paul W. McVey, Houston, Tex.

Application February 13, 1958, Serial No. 715,146

1 Claim. (Cl. 81—15)

My invention relates to the art of forming and contracting metal ferrules. More particularly, I have invented a device that will contract metal ferrules, positioned on a hose or the like, that permits the insertion and withdrawal of work from the side of the device, thereby rendering it unnecessary to thread lengths of hose or the like throught it.

In contracting ferrules, such as for instance those employed in mending hose used to carry oxygen and acetylene for welding apparatus, it has been the practice in the past to employ a device having a plurality of radially arranged dies that translate inwardly to contract a ferrule emplaced on a hose which has been inserted between the dies. The nature of the dies in the devices formerly employed was such that they and their supporting structure prevented the insertion and removal of work from the side. It was therefore necessary to thread the work into and out of the opening between the dies. For example, if a rubber hose 100 feet long were to be mended intermediate its end, it would be necessary to thread as much as 50 feet of hose through the device to get the work into position to contract the mending ferrule, or to remove it after the ferrule had been contracted. The insertion problem in many cases could be eliminated by simply cutting the hose at the damaged point and utilizing the ferrule to join it once again. This, of course, did not eliminate the removal problem.

With the development of modern oxygen-acetylene hoses, the above problem was aggravated. The new hoses were bonded together or held in a common matrix throughout their lengths. To repair this type hose with a ferrule it was necessary to break the bonding of matrix all the way from the point of repair to an end of the hoses in order to separate the two hoses and make the one needing repair capable of entrance and withdrawal from the prior art type reducing tool. This was not only time-consuming but obviously destructive of the bonded hose pair. As a result of this problem, many so hesitated to break the bonding that they resorted to crude and ineffective methods to repair their hoses, such as emplacing ferrules by pliers.

Now, for the first time, my invention makes it possible to insert a hose, contract a ferrule at the damaged point thereon and withdraw the repaired hose all from the side of my reducing tool thereby making it unnecessary to separate a large quantity of valuable bonded hose and thread it in and out of the reducing tool. Utilizing my invention, it is only necessary to break the bonding between as little as one foot of a bonded hose pair in order to repair the damaged hose. The short length of separated hose may be brought back together by a small flexible metal clip or the like, if desired, although this is purely a matter of choice.

It is therefore one object of my invention to provide a ferrule contracting device that will permit the insertion and withdrawal of work from the side of the device, thereby making it possible to insert and withdraw work intermediate the ends of a hose or the like on which the ferrule is to be contracted.

Another object of my invention is to provide a ferrule reducing device that will form ferrules evenly, without flattening, gouging, or otherwise deforming them into unsuitable and undesirable shapes. My invention reduces ferrules evenly without crimping them.

It is a further object of my invention to provide a reliable, cheap, and efficient contracting tool for ferrules and the like.

Other and further objects will become apparent on reading the foregoing and studying the figures associated therewith.

The specific embodiment of my invention that is disclosed herein includes four die members, each of which has an arcuate ferrule shaping surface. Two pivotally mounted die members are arranged in adjacent fashion on a fixed support and two pivotally mounted die members are arranged in like adjacent fashion on a movable support, the two pairs of adjacent dies being mounted in opposing fashion. The movable and fixed supports are positioned on a C-frame member so that an opening is presented that permits the insertion and withdrawal of work through the open side of the frame and through the die members when the die supports are separated. The movable member is actuated by a threaded screw member which may be raised and lowered in order to open and close the die members.

Fig. 1 is a side view of my new ferrule reducing device;

Fig. 2 is a fragmentary sectional side view showing my die members in a separated position. The section of Fig. 2 is taken along a plane passed through the longitudinal axis of the primary and secondary support members;

Fig. 3 is a side view of a die constructed according to my invention;

Fig. 4 is a sectional end view taken along 4—4 of Fig. 1;

Fig. 5 is a fragmentary side view of my device showing the die members just as the arcuate reducing surfaces thereon have contacted a ferrule to be reduced; and Fig. 6 is a fragmentary sectional side view of my device showing the die members just as they have reached a closed position and completed forming a ferrule.

Referring now in detail to the figures, frame member 1 is shaped similar to a C-clamp. Primary die support member 2 is rigidly connected to one extremity thereof, the longitudinal axis of member 2 being substantially pendicular to a straight line connecting the two extremities of the C-frame 1. Member 2 preferably is of U-shaped cross-section to provide recessed interior portion 3 (see Fig. 2) which is substantially rectangular in cross-section, being partially enclosed by shoulders 4 and 5 extending upwardly from the base of member 2 (see Fig. 4). Die members 6 and 7 are pivotally mounted within recess 3, the dies 6 and 7 and the shoulders 4 and 5 having suitable holes therethrough to receive pivot pins 8 and 9.

Dies 6 and 7 are interchangeable. Each die is formed generally as a rectangular parallelepiped having two removed portions from one end face (the geometric location of the cut-away end face of the parallelepiped is along axis Y of Fig. 3) one of which removed portions is shaped as a 90° segment of a right circular cylinder, the longitudinal axis of which cylinder lines in the plane defined by the geometric location of the cutaway end edge of the parallelepiped and intersects the plane of the paper of Fig. 3 in the trace point M. The arcuate reducing surface 20 is formed and defined by this removed quarter cylindrical portion. The other removed portion is wedge-shaped. Its removal forms inclined plane surface end face 21 which intersects the arcuate reducing surface 20 at edge 22.

The dies 6 and 7 are positioned and supported within the recess 3 by pins 8 and 9 so that the arcuate reducing surfaces 20 face each other. When the dies are pivoted to a position in which their longitudinal axes are in alignment, edges 22 of the end faces 21 are substantially in contact. A spring member 30, disposed within the recess 3 and supported by screw 23, biases the adjacent ends of the dies in a direction away from the inner face 32 of the die support member and causes the dies to rest in a position inclined several degrees above their axes of mutual alignment, the dies being held in this position when the opposite ends of the dies' bottom faces 31 strike the inner face 32 of die support member 2, as is shown in Fig. 2.

An elongated cylindrical member 35 projects from the end of primary support member 2 that is adjacent to the central frame member of C-frame 1. Member 35 extends axially toward the opposite leg of C-frame 1. The surfaces of 35 are machined so that a mating part may slide freely thereon.

A threaded recess 36 is formed on the extremity of the C-frame leg opposite the primary support member 2. It is adapted to receive mating threaded cylindrical screw member 37. Threaded member 37 is attached to secondary die support member 45 by means of ball and socket joint 46.

The secondary die support member 45 is configured generally as the primary support member 2. However, the end of the secondary support member adjacent to the central portion of the C-frame 1 has an extension lug 47 attached thereto and extending upwardly therefrom. A cylindrical hole extends through the lug 47 and the secondary support member 45, thus forming a recessed receiving portion 38 which is adapted to receive and engage the projecting cylindrical member 35. Secondary support member 45 is free to move toward or away from the primary support member 2 as the surfaces 39 of receiving portion 38 slide along the smooth surfaces of mating cylindrical member 35 when the threaded cylindrical screw member 37 is screwed downwardly or upwardly, as the case may be.

The secondary support member has disposed within its recessed portion 48 the dies 49 and 50, which are supported by shoulders 51 and 52 by means of pivot pins 53 and 54. The dies 49 and 50 are made as dies 6 and 7 and form an adjacent die pair which opposes the adjacent die pair 6 and 7. Dies 49 and 50 are biased by spring 55, which is positioned with respect to dies 49 and 50 as analogous spring 30 is positioned with respect to its opposing adjacent die pairs, that is dies 6 and 7. Screw 56 holds spring 30 in place.

In operation, starting with the die support members together, the threaded member 37 is screwed upwardly, raising secondary support member 45 which is free to move as its recessed receiving surface 38 slides along the surface of cylindrical projection 35. Since primary die support member 2 is stationary, the members separate, resulting in the separation of the opposing adjacent die pairs, 6 and 7, and 49 and 50.

When the two adjacent die pairs are separated by screwing threaded member 37 upwardly the springs 30 and 55 bias their associated die pairs causing each die to pivot and rotate so that its arcuate reducing surface is moved toward its immediately opposing die and away from its adjacent die. For example, die 49 is pivoted off of the line where its longitudinal axis is common with that of adjacent die 50, its arcuate reducing surface 60 being rotated toward the arcuate reducing surface 20 of opposing die 7 and away from the arcuate reducing surface 60 of adjacent die 50. As the dies are further separated, their rotation ceases at the instant that the ends of their bottom faces 31 and 63 strike the inner faces 32 and 65 of the die supports 2 and 45, respectively. The die location at the stopping point is predetermined by the positioning of the dies in the die support recesses. If the dies are mounted so that their bottom faces are close to the inner faces of the die support members, the dies will be inclined only slightly off the longitudinal axis of alignment when they are in their extreme rotated (open) position. If mounted further away, the inclination from the axis of alignment is, of course, increased. It is by no means critical, but I mount each die so that in its extreme rotated position as illustrated in Fig. 2, its longitudinal axis is inclined about 10° from its longitudinal axis in the closed position illustrated in Fig. 6.

As threaded cylindrical member 37 is further raised, the supports 2 and 45 are further separated, as in turn are adjacent die pairs 6 and 7 and 49 and 50, which remain fixed with respect to further rotation, as explained above. When the dies are a sufficient distance apart, a hose or the like with a ferrule to be contracted positioned thereon is inserted through the open-side portion 78 of the reducing device and positioned axially within the space bounded partially by the four arcuate reducing surfaces of the dies. The threaded cylindrical member 37 is screwed downwardly carrying secondary support member 45 toward primary support member 2 and moving the opposite adjacent die pairs 6 and 7 and 49 and 50 toward each other. When the die pairs are so close together that the ferrule is contacted by portions of each of the four arcuate reducing surfaces, rotation of the dies begins. This position is indicated in Fig. 5, showing surfaces 20 and 60 just as they have contacted ferrule 80, which is positioned on hose 81. The reactive force of the ferrule on the arcuate reducing surfaces of the dies causes the dies to pivot against the direction of their respective spring biasing forces and move toward a position in which the arcuate reducing surfaces more nearly define a cylindrical hole as the support members are brought closer together. The result of this action of the dies is that the ferrules are more or less evenly supported by the die surfaces and the forces set up in contracting the ferrule are distributed, with the aid of the biasing action, thereby preventing the permanent deformation of the ferrule into a flat, gouged, or other unsuitable shape.

The rotation of the die is stopped as lugs 70 and 71 and 72 and 73 strike the surfaces 32 and 65, respectively, of the die support members. These lugs are positioned with respect to the dies so that they will strike the support surfaces when the adjacent die pairs are aligned in such a manner that the longitudinal axis of each member of a given adjacent die pair lies along the line of the longitudinal axis of the other member of that pair. As final alignment occurs the opposing die surfaces 74 and 75 and 76 and 77 are substantially in contact. In this position, shown in Fig. 6, the arcuate reducing surfaces have moved together to define a cylindrical hole and have reduced the ferrule being reduced to conform thereto.

In order to withdraw the ferrule, it is necessary only to screw member 37 upwardly until the die support members have separated sufficiently to free the ferrule from the grasp of the reducing surfaces. Then the ferrule and the member on which it has been contracted may be withdrawn from the open space 78 between the die support members.

If the adjacent die and surfaces were both vertical and plane, the dies could not rotate and still allow the arcuate surfaces of an adjacent die pair to close into a smooth arc. Therefore, I incline the end plane surfaces of my dies somewhat off the vertical axis, the edge that is defined by intersection of the end plane surface with the arcuate portion being the extreme protruding edge of the inclined end plane surface. See end plane surface 21 of Fig. 3.

Although the embodiment that I have just described utilizes a screw member to move the die pairs together, hydraulic, pneumatic, cam lever and other devices would serve as well; accordingly, I do not regard my invention as limited to screw-type moving means.

From the foregoing, it will be seen that this invention is one well adapted to attain all the ends and objects hereinabove set forth, together with other advantages which are obvious and which are inherent in the apparatus.

It will be understood that certain features and subcombinations of my invention are of utility and may be employed without reference to other features and subcombinations and this is contemplated by and within the scope of the claim. Moreover, many possible embodiments may be made of my invention without departing from the scope thereof and various changes in size, shape and materials, as well as details of the illustrated embodiments may be made without departing from the spirit of the invention. I therefore contemplate by the appended claim to cover any such changes and modifications as fall within the true spirit and scope of my invention.

I claim:

A device for forming ferrules comprising a C frame having two arms and a central portion, a primary die support member rigidly connected to one arm of said C frame, a secondary die support member movably connected to the other arm of said C frame and having a guiding recess formed therein, force multiplication moving means for moving said secondary support member forward and rearward along a linear path, an elongated guiding member projecting from said primary support member and mating with the guiding recess on said secondary support member to thereby guide said secondary support member toward said primary support member when said force multiplication moving means are moved rearward, two pairs of dies, each of said dies having a concave arcuate reducing surface adapted to support a portion of the surface of the ferrule, one pair of said dies being pivotally mounted with their arcuate surfaces adjacent each other on said primary support member and the other pair of said dies being pivotally mounted with their arcuate surfaces adjacent each other on said secondary support member, said pairs of dies being disposed on said primary and secondary support members in opposing fashion, spring biasing means for each of said dies tending to rotate the arcuate surface portion of each die about its pivot in the direction of its immediately opposing die and away from its adjacent die, said primary support member and said secondary support member each further comprising shoulders configured to support said die pairs and said die pivots at right angles to the direction of pivot of said dies thereby constraining the motion of said dies to their direction of pivot, said elongated guiding member and said guiding recess on said secondary member being configured and arranged so that when assembled they engage their respective mating parts and align said secondary support member and said primary support member oppositely so that said dies all pivot in the same plane, whereby when said moving means moves the secondary support member forwardly toward the primary support member and causes the arcuate surfaces of the adjacent die pairs to contact the outer surfaces of a ferrule and begin to contract said ferrule, the back pressure resulting on the arcuate die surfaces from the ferrule being contracted causes the dies to further pivot and the four arcuate surfaces thereon to move toward the shape of a cylindrical hole, said biasing means tending to distribute the forces more evenly on the ferrule being formed, said dies giving an increasing force multiplication effect as said adjacent dies are pivoted together, said dies ultimately meeting and forming a ferrule in the desired cylindrical shape.

References Cited in the file of this patent

UNITED STATES PATENTS

| Number | Name | Date |
|---|---|---|
| 243,277 | Love | June 21, 1881 |
| 371,805 | Vanderman | Oct. 18, 1887 |
| 681,160 | Weibezahl | Aug. 20, 1901 |
| 758,195 | Schiweinert et al. | Apr. 26, 1904 |
| 2,256,457 | Douglas | Sept. 16, 1941 |
| 2,398,658 | Mead | Apr. 16, 1946 |
| 2,788,686 | Holt | Apr. 16, 1957 |
| 2,829,547 | Barnes | Apr. 8, 1958 |